Jan. 3, 1933.  F. M. HEATH  1,893,079
VENTILATED HORSE COLLAR CUSHION
Original Filed April 14, 1931   2 Sheets-Sheet 1
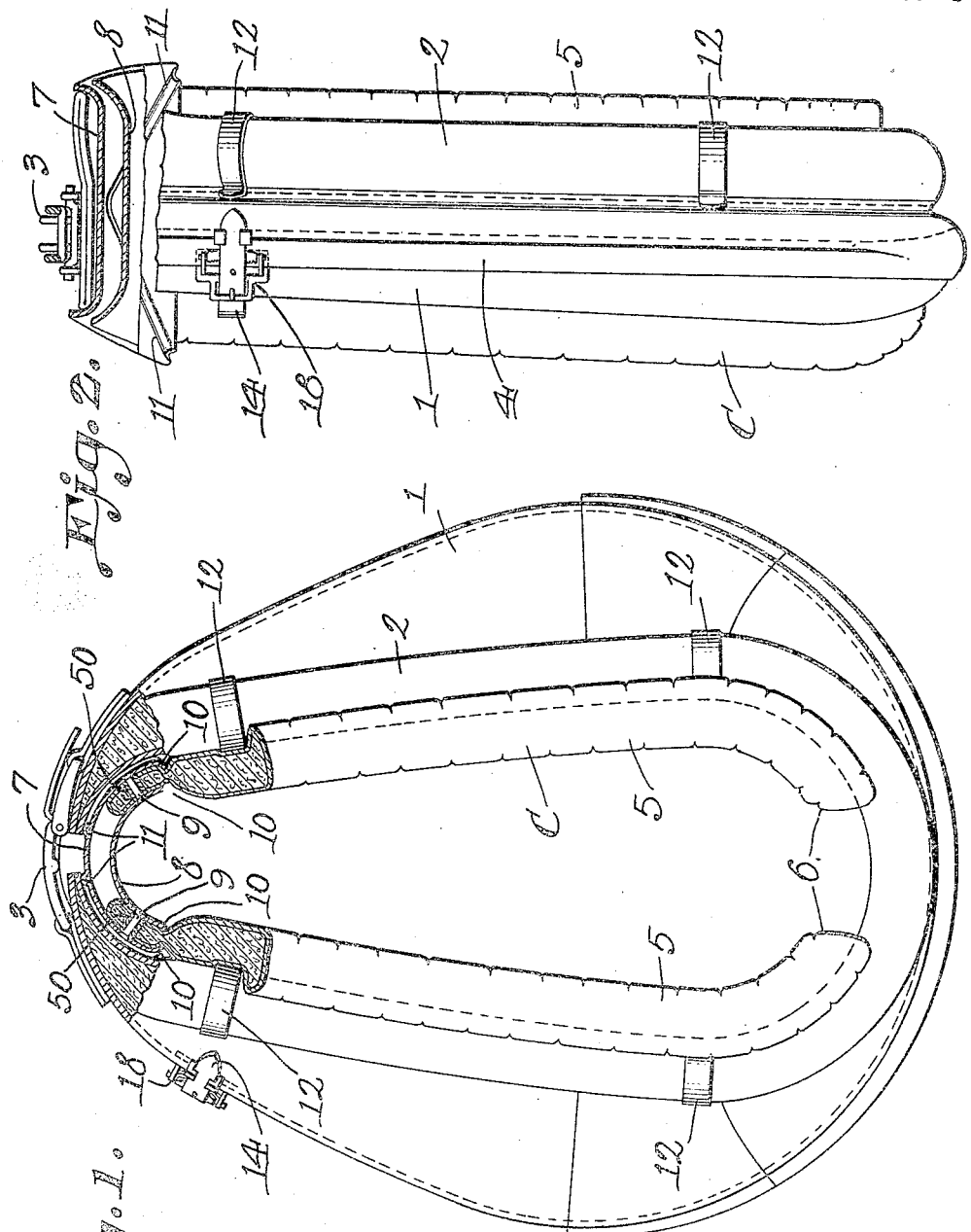
Frank M. Heath, Inventor

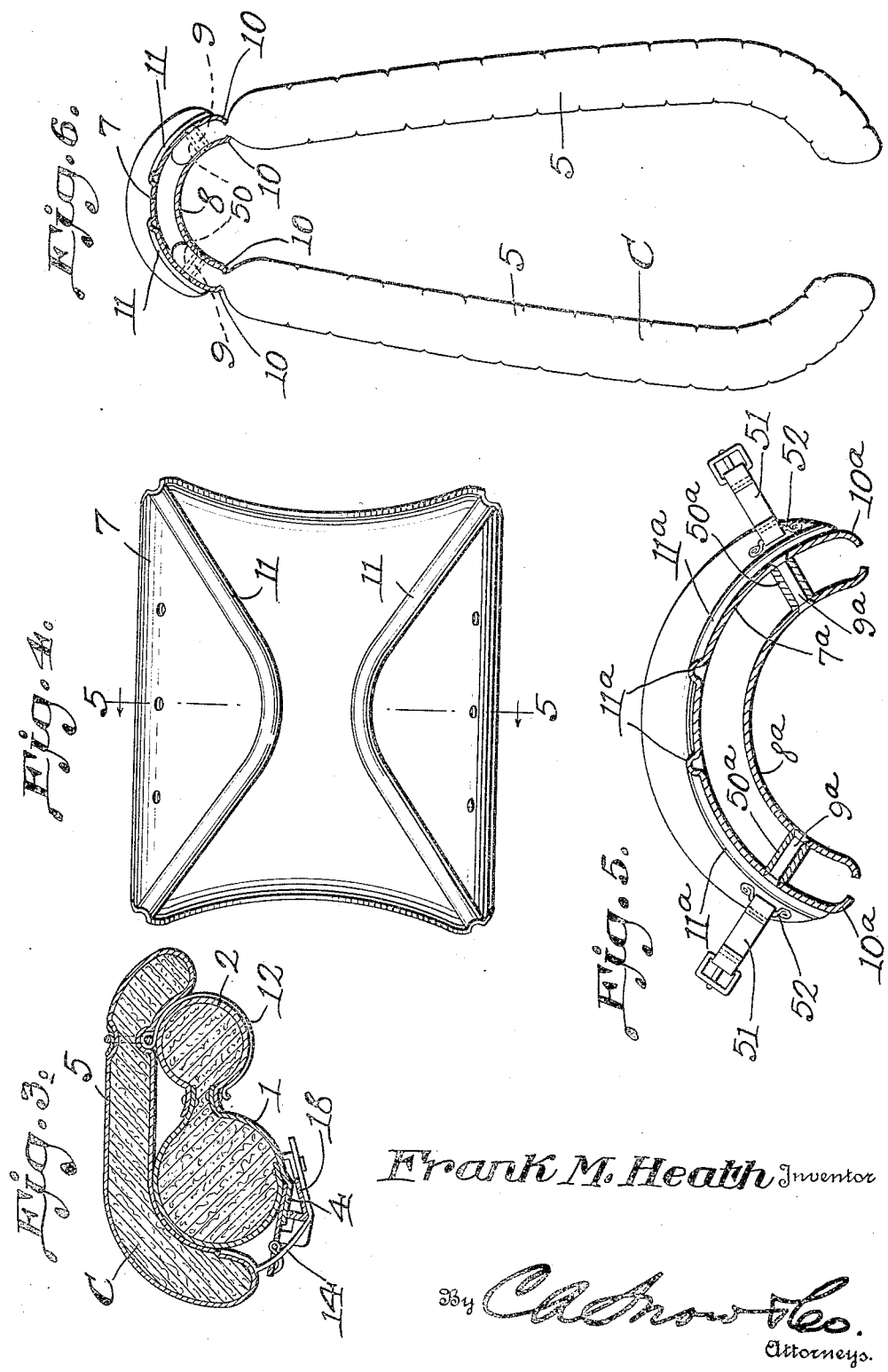

Patented Jan. 3, 1933                                                           1,893,079

UNITED STATES PATENT OFFICE

FRANK M. HEATH, OF SILVER SPRING, MARYLAND

VENTILATED HORSE COLLAR CUSHION

Original application filed April 14, 1931, Serial No. 530,036. Patent No. 1,840,197, granted January 5, 1932.
Divided and this application filed December 7, 1931. Serial No. 579,557.

This invention aims to provide a novel means for ventilating the upper end of a horse collar, and for ventilating the upper end of the cushion, if a cushion is used.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Fig. 1 shows in elevation, a horse collar equipped with the ventilating means forming the subject matter of this application, parts being in section;

Fig. 2 is an elevation wherein the horse collar is viewed edgewise, parts being in section;

Fig. 3 is a cross section;

Fig. 4 is a plan of one of the pad plates;

Fig. 5 is a section taken approximately on the line 5—5 of Fig. 4, but showing a slight modification;

Fig. 6 is an elevation of the pad and the ventilating plates, as disclosed in Figs. 1 and 2, but detached from the horse collar, parts being in section.

In Figs. 1 and 2, the numeral 1 marks a horse collar of any desired kind, having a hame roll 2, the relatively movable upper ends of the collar being connected by a clasp 3, or equivalent device. One or both sides of the horse collar are supplied with a transverse tongue 4, having a free end, as shown in Fig. 3.

The sweat pad or cushion C embodies yieldable side members 5, the lower ends 6 of which are spaced, as shown in Fig. 1. The upper ends of the side members 5 of the cushion C are bound between an upper plate 7 and a lower plate 8. The plates 7 and 8 are curved both longitudinally and transversely, as a comparision of Figs. 1 and 2 will show, and they are made of zinc or some other metal, or combination of metals, which will not rust, or corrode with sweat. Rivets 9 or the like (Fig. 1) connect the plates 7 and 8 with the upper ends of the side members 5 of the cushion C, and the lower edges of the plates are turned toward each other, as at 10, to acquire a firm hold on the side members of the cushion. Spacers 50, of tubular form, may be interposed between the plates 7 and 8, the spacers being mounted on the securing devices or rivets 9. The plates 7 and 8 are somewhat wider than the side members 5 of the cushion C, as Fig. 2 will show. Fig. 4 discloses that the upper plate 7 is provided with V-shaped, upstanding ribs 11, having their apices disposed near to the center of the plate.

When the horse is working, there is a rocking movement of the cushion C, alternately, with respect to each shoulder, and adequate ventilation thus is provided at the shoulders. There is no corresponding ventilation at the neck, because the collar has no similar rocking movement there. As a consequence, sore or scalded necks result, when ordinary cushions or sweat pads are used. The non-corrosive plates 7—8, being spaced apart, to afford ventilation, and the cushion is made cool and sanitary at the neck.

The lower plate 8 bears on the neck throughout a progressively increasing area, from the center line outwardly, in opposite directions, due to the weight of the wagon tongue, the hames or the like. The plate 8 is a ready and effective conductor of heat, and as the air passes between the plates 7 and 8, ventilation is provided, and the pad is kept cool at the top, and there is no smothering of the neck.

Dust may accumulate on the plate 7, and water will find its way, in a rainstorm, into the cushion 5, if the plate 7 is not employed. As a result, the cushion C becomes wet, water-logged, non-absorbent, soggy, and hard, and its function, therefore, as a cushioning means, is impaired accordingly. In the device forming the subject matter of this application, rain water finding its way on the plate 7, outwardly of the ribs 11, will be carried laterally by the ribs, and, as shown in Fig. 2, will be discharged clear of the pad or cushion C.

No valid objection can be raised against making the plates 7 and 8 of metal, because the plates are located well ahead of the spine; and above the vertibrae of the neck, there lies a large amount of heavy muscle, which is directly below the plate 8, this mass of muscle forming a natural, flexible cushion. The plate 8 does not tend to crowd the neck inwardly, from the sides toward the center, but bears on the neck, with a progressively increasing area, from the center toward the sides, advantage being taken of the natural muscular cushion of the neck, and that natural muscular cushion remaining flexible and unimpaired. By "progressively increasing area," I mean that the harder the plate 8 presses down, the larger will the area of contact between the plate and the horse's neck become.

The side members 5 of the cushion C may carry spring clips 12, engaging the hame roll 2. These clips do not prevent the cushion from moving longitudinally. Those who wish to keep the cushion from moving longitudinally can place a strap 14 on the cushion and connect the strap with the tongue 4 by means of a fastener 18, and other means to the same end may be provided. This is a feature which need not be further explained and discussed here, because it is covered in my patent for a horse collar cushion, No. 1,840,197, granted January 5, 1932, the present application disclosing matter divided out of said patent, it being possible to use alone, either the device shown in the patent or the ventilating means shown in this present application, or to use the two together.

In the modification shown in Fig. 5 of the drawing, parts hereinbefore described have been designated by numerals previously used, with the suffix "a". In this modification, the cushion members 5 of Fig. 1 are dispensed with, and the ventilating device attached to the horse collar by straps 51, or other suitable means, engaged through the spaced holders 52 on the upper surface of the plate 7a.

What is claimed is:—

1. A horse collar cushion comprising side members connected at their upper ends by a plate having laterally-extended water-deflecting means, which discharges clear of the longitudinal edges of the side members.

2. A horse collar cushion comprising side members, and upper and lower metal plates assembled with and joining the upper ends of the side members, the plates being spaced to afford ventilation, the upper plate having laterally-extended water-deflecting means which discharges clear of the longitudinal edges of the cushion.

In testimony that I claim the foregoing as my own, I have hereto affixed my signature.

FRANK M. HEATH.